United States Patent [19]

Hendow

[11] Patent Number: 5,163,114
[45] Date of Patent: Nov. 10, 1992

[54] FIBER OPTICS MODE COUPLING LIGHT BEAM INTO AN OPTICAL CAVITY

[75] Inventor: Sami T. Hendow, Monarch Beach, Calif.

[73] Assignee: Newport Corporation, Fountain Valley, Calif.

[21] Appl. No.: 653,906

[22] Filed: Feb. 12, 1991

[51] Int. Cl.⁵ .............................................. G02B 6/32
[52] U.S. Cl. ...................................... 385/33; 385/31; 385/88
[58] Field of Search .......................... 350/96.18, 96.2; 385/31, 32, 33, 39, 88, 92, 93

[56] References Cited

U.S. PATENT DOCUMENTS

| | | | |
|---|---|---|---|
| 4,542,956 | 9/1985 | McCrickerd | 350/96.2 |
| 4,707,073 | 11/1987 | Kocher | 350/96.18 X |
| 4,753,510 | 6/1988 | Sezerman | 350/96.21 |
| 4,820,042 | 4/1989 | Barger | 356/153 |
| 4,889,406 | 12/1989 | Sezerman | 350/96.21 |
| 4,909,586 | 3/1990 | Tanaka et al. | 385/33 |
| 4,989,944 | 2/1991 | Tholen et al. | 350/96.18 |
| 4,997,250 | 3/1991 | Ortiz, Jr. | 350/96.18 |

OTHER PUBLICATIONS

Fiber Optic Beam Coupler, by Burleigh Instruments, Inc.
Fiber Optic Beam Delivery Systems for Ion, Dye and Helium Neon Lasers, by Photonetics/Finnova.
LDS Laser Delivery System, by York Ventures & Special Optical Products Ltd.
Selfoc Fiber Collimators, by NSG America, Inc.
The Theory and Design of the Selfoc Lens, by NSG America, Inc.
"Wavelength-Selective Filters for Single-Mode Fiber WDM Systems Using Fabry-Perot Interferometers", by Stephen R. Mallinson, Appl. Opt., vol. 26, No. 3, p. 430 (1 Feb. 1987).
"Pigtailed High-Finesse Tunable Fibre Fabry-Perot Interferometers with Large, Medium and Small Free Spectral Ranges", by J. Stone and L. W. Stutz, Electronic Letters, vol. 23, No. 15, p. 781 (16 Jul. 1987).

*Primary Examiner*—John D. Lee
*Assistant Examiner*—Phan T. Heartney
*Attorney, Agent, or Firm*—Benoit Law Corporation

[57] ABSTRACT

Methods and apparatus for mode coupling a light beam into an optical cavity provide an input fiber pigtail with a fiber endface at one end of that input fiber pigtail. A cavity input aperture adapter is made integral with that input fiber pigtail at an opposite end of that input fiber pigtail for attachment to the housing of the optical cavity at its light input aperture. The input fiber pigtail is provided with a fiber input coupler integral with that input fiber pigtail at the above mentioned one end of the input fiber pigtail. That fiber input coupler has an integrated lens for focusing the light beam onto the fiber endface. The cavity input aperture adapter has a lens assembly for directing light from the above mentioned opposite end of the fiber pigtail into the input aperture of the optical cavity. Either the fiber input coupler or the cavity input aperture adapter may be omitted in different embodiments.

31 Claims, 4 Drawing Sheets

FIBER OPTICS MODE COUPLING LIGHT BEAM INTO AN OPTICAL CAVITY

BACKGROUND OF THE INVENTION

1. Field of the Invention

The subject invention relates to radiant energy transmission, coupling, analysis and filtering and, more specifically, to fiber optics systems, fiber optics and optical cavity adaptors, and to optical cavity systems.

2. Information Disclosure Statement

The following disclosure statement is made pursuant to the duty of disclosure imposed by law and formulated in 37 CFR 1.56(a). No representation is hereby made that information thus disclosed in fact constitutes prior art, inasmuch as 37 CFR 1.56(a) relies on a materiality concept which depends on uncertain and inevitably subjective elements of substantial likelihood and reasonableness and inasmuch as a growing attitude appears to require citation of material which might lead to a discovery of a pertinent material though not necessarily being of itself pertinent. Also, the following comments contain conclusions and observations which have only been drawn or become apparent after conception of the subject invention or which contrast the subject invention or its merits against the background of developments which may be subsequent in time or priority.

U.S. Pat. No. 4,820,042, by Richard L. Barger, Ph.D., issued Apr. 11, 1989 to Newport Corporation, for optical cavity systems. While a SuperCavity Optical Spectrum Analyzer pursuant to that patent provides up to 200 times the resolution of conventional Fabry-Perot cavities, mode-matching various light sources to the cavity is not always straightforward. Particularly needed are improvements in the coupling of light into the optical cavity from free-space, collimated laser beams, single-mode fibers, and fiber networks.

Also needed is an elimination of the need to mode-match to the optical cavity, while providing a fast method of obtaining high-resolution spectral data on the optical characteristics of light in fiber systems or diode lasers.

It would also be desirable that the optical cavity could be remotely located when, for example, space on optical tables and the like is limited or harsh environmental conditions exist.

Improvements in this respect preferably should be retrofitable to existing optical cavities.

As may for instance be seen from U.S. Pat. No. 4,542,956, by John T. McCrickerd, issued Sep. 24, 1985 for Fiber Optics Transfer Systems, U.S. Pat. Nos. 4,753,510 and 4,889,406, by Omur M. Sezerman, issued Jun. 28, 1988 and Dec. 26, 1989, respectively, for Tilt Adjustable Optical Fibre Connectors, and from a publication entitled FIBER OPTIC BEAM COUPLER, by Burleigh Instruments, Inc., prior-art technology does not appear to have met the above mentioned need. Reference may in this respect also be had to a publication by Photonetics/Finnova for fiber optic beam delivery systems, to a publication by York Ventures & Special Optical Products Ltd., entitled LDS Laser Delivery System, and to publications by NSG AMERICA, INC. for their SELFOC Fiber Collimators, and the Theory and Design of the SELFOC Lens.

Application of optical fiber technology to telecommunication has been disclosed by Stephen R. Mallinson, in "Wavelength-selective filters for single-mode fiber WDM systems using Fabry-Perot interferometers", Appl. Opt., Vol. 26, No. 3, p. 430 (1 Feb. 1987). Reference should in this respect also be had to J. Stone and L. W. Stutz, "Pigtailed High-Finesse Fibre Fabry-Perot Intrferometer with Large, Medium, and Small Free Spectral Ranges", Electronics Letters, Vol. 23, No. 15, p. 781 (16th July, 1987).

SUMMARY OF THE INVENTION

It is a general object of this invention to overcome the prior-art disadvantages and to meet the needs mentioned or implied in the above Information Disclosure Statement or in other parts hereof.

It is a germane object of this invention to provide improved mode coupling of light beams into cavities, It is a related object of this invention to provide improved fiber optics systems and couplers.

It is also an object of this invention to provide improved optical cavity systems.

Other objects of the invention will become more readily apparent in the further course of this disclosure.

The invention resides in a method of mode coupling a light beam into an optical cavity having a housing and a cavity input aperture, comprising in combination the steps of providing an input fiber pigtail with a fiber endface at one end of that input fiber pigtail, providing that input fiber pigtail with a cavity input aperture adapter integral with that input fiber pigtail at an opposite end of that input fiber pigtail for attachment to the housing of the optical cavity at the input aperture, providing the input fiber pigtail with a fiber input coupler integral with that input fiber pigtail at said one end of that input fiber pigtail, providing the fiber input coupler with an integrated lens for focusing the light beam onto the fiber endface, and providing the cavity input aperture adapter with a lens assembly for directing light from the opposite end of the fiber pigtail into the input aperture of the optical cavity.

According to one aspect of that invention, the fiber input coupler is provided with a fiber endface alignment mirror, and the fiber endface is aligned with that alignment mirror relative to the light beam.

According to a similar aspect of the invention, the integral cavity input aperture adapter is attached to the housing of the optical cavity at the input aperture, the fiber input coupler is provided with a light beam alignment mirror, the fiber endface is angularly aligned with that alignment mirror relative to the light beam which is focused with the integrated lens onto the fiber endface in the fiber input coupler, light is conducted from the focused light beam with the input fiber pigtail to the lens assembly in the cavity input aperture adapter, and conducted light from the opposite end of the fiber pigtail is directed with the lens assembly through the input aperture into the optical cavity.

According to a related aspect of the invention, the integral cavity input aperture adapter is attached to the housing of the optical cavity at the aperture, the light beam is focused with the integrated lens onto the fiber endface in the fiber input coupler, light is conducted from the focused light beam with the input fiber pigtail to the lens assembly in the cavity input aperture adapter, and conducted light is directed from the opposite end of the fiber pigtail with the lens assembly through the input aperture into the optical cavity.

The invention resides also in a method of mode coupling a light beam into an optical cavity having a housing and a cavity input aperture, comprising in combination the steps of providing an input fiber pigtail with a fiber endface at one end of that input fiber pigtail, providing that input fiber pigtail with a cavity input aperture adapter integral with that input fiber pigtail at an opposite end of that input fiber pigtail for attachment to the housing of the optical cavity at the input aperture and providing that cavity input aperture adapter with a lens assembly for directing light from the opposite end of the fiber pigtail into the input aperture of the optical cavity, attaching the integral cavity input aperture adapter to the housing of the optical cavity at the aperture, directing the light beam onto said fiber endface in the fiber input coupler, conducting light from the focused light beam with the input fiber pigtail to the lens assembly in the cavity input aperture adapter and directing conducted light from said opposite end of the fiber pigtail with the lens assembly through the input aperture into the optical cavity.

The invention resides also in a method of coupling a light beam into an optical fiber, comprising in combination the steps of providing that optical fiber with a fiber endface, providing that optical fiber with a fiber input coupler integral with that optical fiber at the fiber endface, providing that fiber input coupler with an integrated lens for focusing the light beam onto the fiber endface, and providing that fiber input coupler with a fiber endface alignment mirror for aligning the fiber endface with that alignment mirror relative to the light beam.

The invention resides also in apparatus for mode coupling a light beam into an optical cavity having a housing and a cavity input aperture, comprising in combination, an input fiber pigtail having a fiber endface at one end of that input fiber pigtail, a cavity input aperture adapter integral with that input fiber pigtail at an opposite end of that input fiber pigtail, a fiber input coupler integral with that input fiber pigtail at said one end of that input fiber pigtail, a fiber endface alignment mirror on the fiber input coupler a light beam fiber endface focusing lens in that fiber input coupler at the fiber endface, and a fiber pigtail light output directing lens assembly in the cavity input aperture adapter at the opposite end of the input fiber pigtail.

The invention resides also in apparatus for mode coupling a light beam into an optical cavity having a housing and a cavity input aperture, comprising in combination, an input fiber pigtail having a fiber endface at one end of that input fiber pigtail, a cavity input aperture adapter integral with that input fiber pigtail at an opposite end of that input fiber pigtail, and a fiber pigtail light output directing lens assembly in that cavity input aperture adapter at the opposite end of the input fiber pigtail. That cavity input aperture adapter in this and other embodiments of the invention, includes an adapter housing, a central optical fiber adapter assembly in that adapter housing, and adjustment elements for the central optical fiber adapter in that adapter housing.

The invention also resides in apparatus for coupling a light beam into an optical fiber having a fiber endface, comprising in combination, a fiber input coupler integral with that optical fiber at the fiber endface, a light beam fiber endface focusing lens in that fiber input coupler at the fiber endface, and a fiber endface alignment mirror on that fiber input coupler.

The invention also resides in the combination of an optical cavity having a housing and a cavity input aperture, and means for mode coupling a light beam through that cavity input aperture into that optical cavity, including an input fiber pigtail having a fiber endface at one end of that input fiber pigtail, a cavity input aperture adapter integral with that input fiber pigtail at an opposite end of that input fiber pigtail and attached to the cavity housing around the cavity input aperture, and a fiber pigtail light output directing lens assembly in that cavity input aperture adapter between the opposite end of the input fiber pigtail and the cavity input aperture.

Within the scope of the invention, this combination may include a fiber input coupler integral with the input fiber pigtail at said one end of that input fiber pigtail, and a light beam fiber endface focusing lens in that fiber input coupler at the fiber endface. A fiber endface alignment mirror may be provided on that fiber input coupler.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or equivalent parts, and in which.

DESCRIPTION OF PREFERRED EMBODIMENTS

Figure 1:
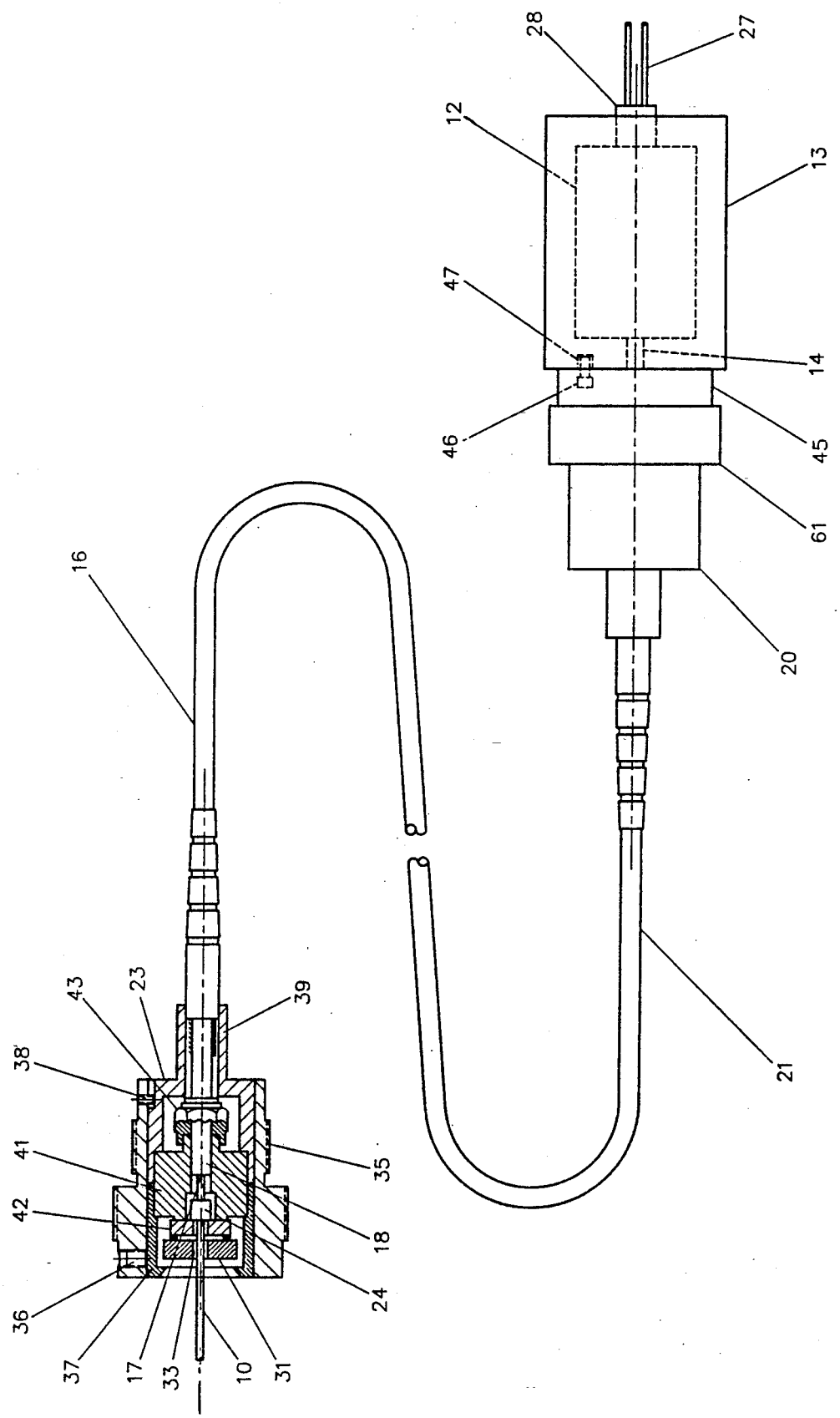
FIG. 1 is a side view of an optical fiber input coupler according to a preferred embodiment of the invention and of an optical cavity system according to a related aspect of the invention.

The drawings show methods and apparatus according to embodiments of the invention for mode coupling a light beam 10 into an optical cavity 12 having a housing 13 and a cavity input aperture 14. The cavity may, but need not be, the kind of optical cavity disclosed in the above mentioned Barger U.S. Pat. No. 4,820,042, which is herewith incorporated by reference herein.

The illustrated embodiment of the invention provides an input fiber pigtail 16 with a fiber endface 17 at one end 18 of that input fiber pigtail. The expression "pigtail" as herein employed is well known in electrical circuit and fiber optics experimentation and implementation, and denotes a relatively short piece of wire or, in the subject case, of optical fiber. In practice, the pigtail 16 is preferably at least one meter long and typically will be some 2 to 3 meters in length.

The illustrated embodiment of the invention provides the input fiber pigtail 16 with a cavity input aperture adapter 20 integral with the input fiber pigtail at an opposite end 21 of that input fiber pigtail for attachment to the housing 13 of the optical cavity 12 at its input aperture 14.

The illustrated embodiment of the invention also provides the input fiber pigtail with a fiber input coupler 23 integral with the input fiber pigtail at the one end 18 of that input fiber pigtail 16, and provides that fiber input coupler 23 with an integrated lens 24 for focusing the light beam 10 onto the fiber endface 17. Similarly, the cavity input aperture adapter 20 is provided with a lens assembly 25 for directing light from that opposite end 21 of the fiber pigtail 16 into the input aperture 14 of the optical cavity 12.

As indicated in FIG. 1, an embodiment of the invention attaches the integral cavity input aperture adapter 20 to the housing 13 of the optical cavity 12 at its aperture 14, and focuses the light beam 10 with the integrated lens 24 onto the fiber endface 17 in the fiber input coupler 23.

Light from the focused light beam 10 is conducted with the input fiber pigtail 16 to the lens assembly 25 in the cavity input aperture adapter 20 and such conducted light is directed from that opposite end 21 of the fiber pigtail 16 with that lens assembly 25 through the input aperture 14 into the optical cavity 12. The cavity 12 may have an output, such as the electrical signal output 27 shown in FIG. 1. A photodetector assembly 28 may be used for that purpose, but the invention is not so limited. For instance, the optical cavity 12 could be used as a transmission or resonance filter having a light output. In that case, a duplicate of the assembly with or without input coupler 23 may be used at the other end of the cavity 14 (where the component 28 is now shown).

Figure 2:
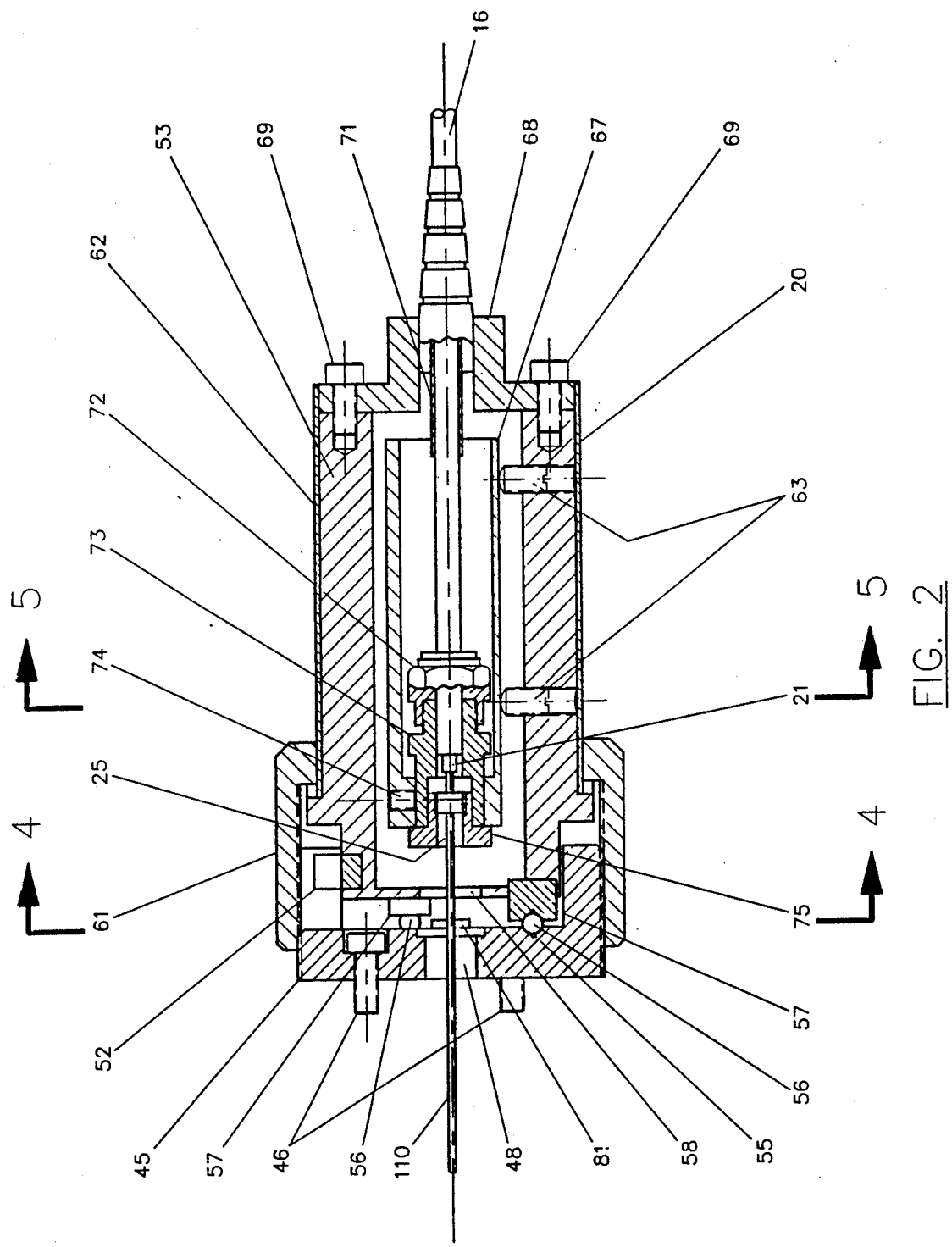
FIG. 2 is a longitudinal section on an enlarged scale of an optical cavity input aperture adapter according to an embodiment of the invention, that may be used separately from or in conjunction with the system of FIG. 1, such as at 20 in FIG. 1.
Figure 4:
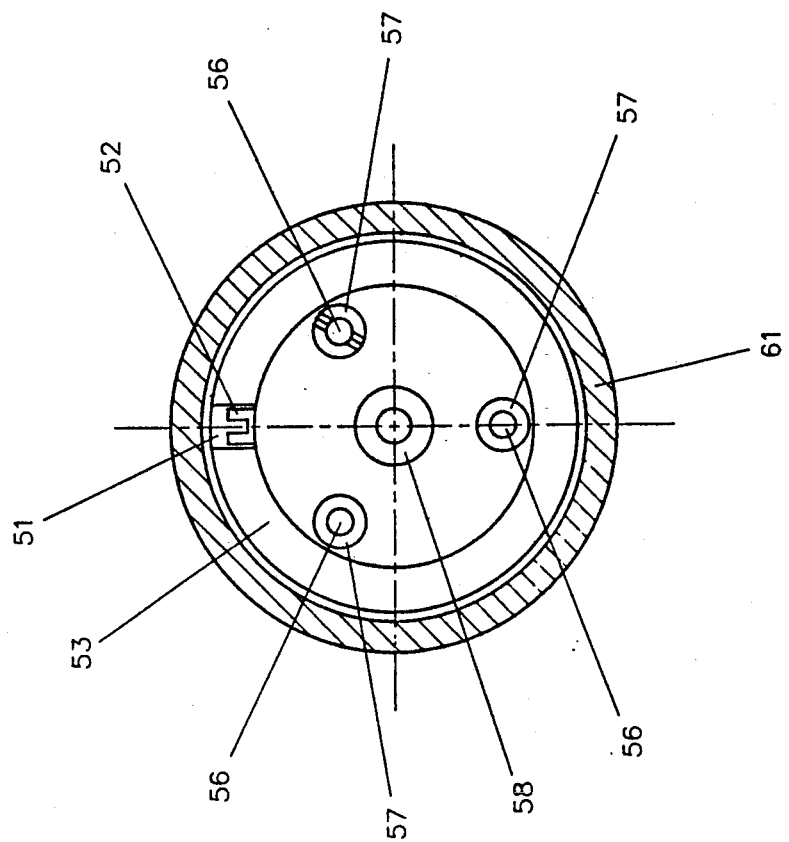
FIG. 4 is a section, on a reduced scale, taken on the line 4—4 in FIG. 2.

According to a preferred embodiment of the invention, the fiber input coupler 23 is provided with a fiber endface alignment mirror 31 perpendicularly to the light beam 10. The fiber endface 17 may be aligned with that alignment mirror 31 relative to the light beam 10, such as by reflecting the beam off the mirror 31 and tilting the coupler 23 until the beam 10 retroflects. A mount such as shown in FIG. 2 of the incorporated Barger U.S. Pat. No. 4,820,042 may be used in a similar manner as in that patent to tilt the aligned coupler 23 and to move it translatorily into alignment with the beam 10.

The illustrated embodiment of the invention provides an aperture 33 for the light beam in the alignment mirror 31. The alignment mirror 31 preferably is circular about the aperture 33 for the light beam 10. The coupler 23 is translatorily aligned so that the light beam 10 enters and proceeds through the central aperture 33 in the alignment mirror 31.

The currently discussed embodiment thus provides the fiber input coupler 23 with a light beam alignment mirror 31 and angularly alignes the fiber endface 17 with that alignment mirror relative to the light beam 10, such as in the manner disclosed in the incorporated Barger U.S. Pat. No. 4,820,042 for the optical cavity itself. However, as a special advantage of the illustrated embodiment of the subject invention, the cavity 12 need not be angularly adjusted, if the input coupler 23 is angularly adjusted as herein disclosed.

The illustrated fiber input coupler 23 includes an adapter mount 35 containing a set screw 36 at a front housing 37 and a set screw 38 at a rear housing 39 in the adapter mount. These front and rear housing sections, in turn, contain a fiber adapter 41 which has a holder 42 for the lens 24 mounted on a front side thereof, and a fiber cable connector 43 at the rear or opposite end. The alignment mirror 31 is mounted on the lens holder 42, such as shown in FIG. 1.

Figure 3:
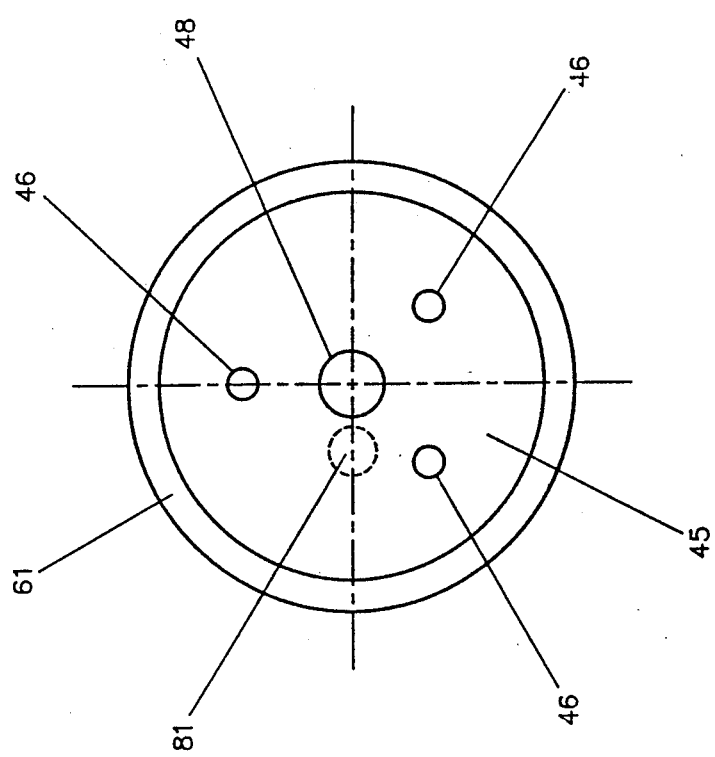
FIG. 3 is a front view, from the left-hand side of the adapter according to FIG. 2 on a reduced scale.

The cavity input aperture adapter 20 has an outer cavity adapter 45 seen in FIG. 1 and shown in more detail in FIGS. 2 and 3. That adapter 45 may be part of or include a cavity housing fastener, such as in the form of cap head socket screws 46 entering corresponding capped holes in the cavity housing 13, one of which is shown in dotted outline at 47 in FIG. 1. These components 46 and 47 thus represent corresponding fastener parts on the cavity housing 13 and cavity input aperture adapter 20 or on its frontal cavity adapter 45. That adapter 45 has a preferably central aperture 48 in alignment with the cavity input aperture 14 for the light beam 110 proceding from the end 21 of the optical fiber or input fiber pigtail 16 and light output directing lens 25.

The adapter 45 also has a longitudinal keyway 51 in which a key or guide pin 52 slides for axial adjustment of a cylindrical adapter housing 53. The adapter 45 also has three preferably evenly distributed ball sockets or notches 55 for an equal number of three bearing balls 56 which, in turn, rest, respectively, in corresponding notches of an equal number of bearing pads attached to a front face of the adapter housing 53. The bearing balls 56 and ball mounts or pads 57 surround a light beam aperture 58 which penetrates the front face of the adapter housing 53 in alignment with the light beam aperture 48 of the adapter 45 and thereby in alignment with the cavity input aperture 14.

The adapter housing 53 is mounted on the cavity adapter 45 by a circumferential cap 61 threaded on the adapter 45. The adapter housing 53 may be provided with an outer sleeve 62 to prevent tampering with adjustment screws 63 to 66 for a cental optical fiber adapter assembly 67 extending substantially coaxially with the preferably cyclindrical adapter housing 53.

The adapter housing 53 has a radial or end cover 68 attached thereto by preferably evenly distributed fasteners or screws 69. The optical fiber or fiber pigtail extends through an axial bore 71 in that adapter housing end cap 68 and axially through the fiber optics assembly 67 to a fiber connector 72 of a fiber adapter 73.

That fiber adapter 73 is retained with a set screw 74 coaxially in the sleeve of the fiber optics assembly 67. The fiber adapter 73, in turn, detains or mounts a holder 75 for the lens or lens assembly 25.

By way of example, the drawings show rod lenses at 24 and 25 for the fiber input and output optics in the fiber input coupler 23 and the optical cavity adapter 20. By way of example, graded index rod lenses, such as disclosed in the above mentioned literature by NSG America, Inc., may be employed for this purpose, but the subject invention is not so limited.

Figure 6:
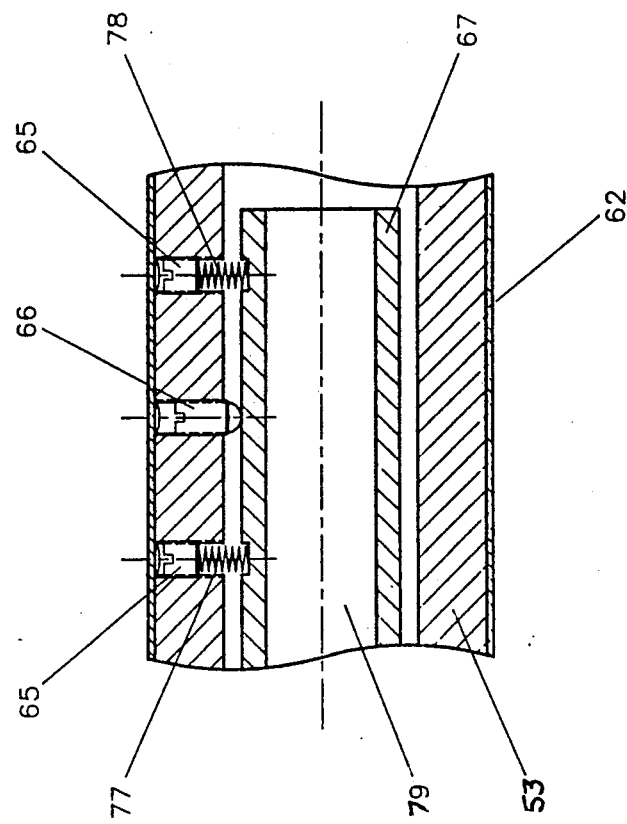
FIG. 6 is a section taken on the line 6—6 in FIG. 5.
Figure 5:
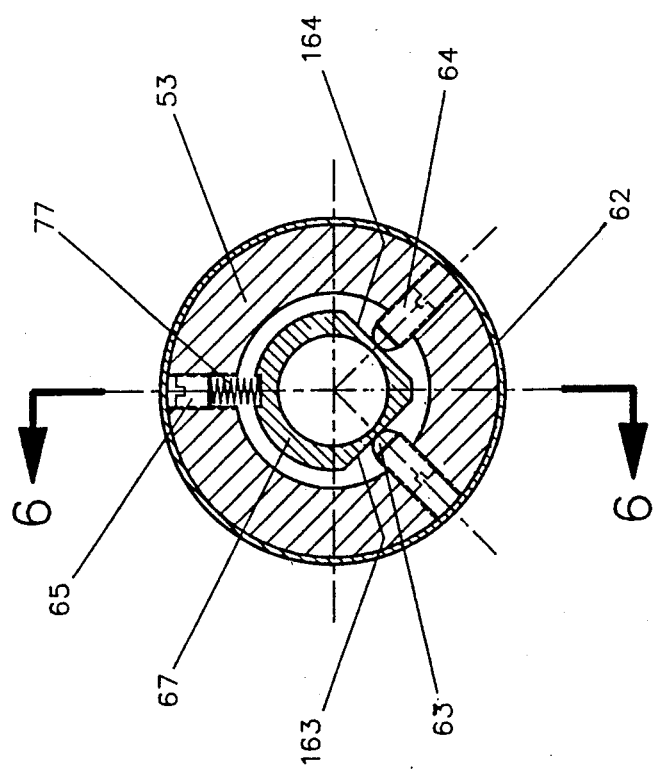
FIG. 5 is a section, on a reduced scale, taken on the line 5—5 in FIG. 2.

The components herein disclosed are preferably adjusted at the factory. However, FIGS. 2, 5 and 6 show an example of adjusting the optical fiber assembly 67 for optimum mode coupling of the beam 110. To avoid overloading of FIGS. 5 and 6, the fiber optics connector 72 seen in FIG. 2 has not been shown in the sections of FIGS. 5 and 6.

For realignment and focusing, the cavity output leads 27 are preferably connected to an oscilloscope with which the coupling efficiency may be observed, such as through a display of the familiar translation versus coupling efficiency curve displaying a central lobe at the global maximum between the smaller local maxima. Realignment of the focusing optics is achieved in the illustrated preferred embodiment of the invention by a combination of angle and translation adjustment of the optical fiber subassembly 67 shown in FIGS. 2, 5 and 6.

To initiate an adjustment procedure, one may loosen the central lock screw 66 one turn while observing the oscilloscope to monitor the displayed signal amplitude and to locate the position and direction of the zero-th order (fundamental) transverse mode of the family. Any adjustment of the control screws is directed at maximizing the amplitude of this mode. Helical compression springs 77 and 78 at first and second screws 65 enable control adjustment.

There are four control screws, two in the front and two in the back. The two front control screws are seen at 63 and 64 in FIG. 5. The back control also includes a set of screws 63 and 64, of which the back control screw 63 is seen at the right-hand side in FIG. 2, while the other back control screw 64 is covered up by the front control screw 64 in FIG. 5. The two front and two back control screws 63 and 64 are positioned at 90 degrees to each other so as to decouple motion in the horizontal axis from that in the vertical. Orthagonal axial flats 163 and 164 are provided on the subassembly 67 for the same purpose at the tips of screws 63 and 64.

For initial adjustment one may choose either the horizontal or the vertical axis. Place two screw drivers on the control screws for that axis, one on the front and one on the back control screw 63—63 or 64—64. Do not attempt to adjust each screw independently to maximize the zero-th order mode. This provides only local maxima. To obtain a global maximum, turn one screw a few degrees and search for the maximum by adjusting the other screw, turning it a few degrees to either the left or to the right. Repeat this step until the mode peaks.

Repeat this with the other axis. Iterate this procedure to ensure that all axes are peaked. This motion is necessary since the object of the alignment is to point the focused beam to the center of the resonant cavity where the waist is located.

After the alignment is complete, lock the position in place by using the center lock screw 66. Tighten gently-overtightening may slightly misalign the optical subassembly. If this occurs, it may only be necessary to adjust the back control screws to peak the original signal. Note that the position of the optical sub-assembly for optimum coupling to the optical cavity may not be at the center, but may be somewhat off-center from the mechanical axis 79 without affecting performance.

As an added convenience, an alignment mirror 81 is also positioned inside the adapter 45 near the light beam aperture 48. In this respect, the adapter housing 53 with optical subassembly 67 may be removed from the adapter 45 by loosening the cap screw 61. In that case, the second alignment mirror 81 may be used as in the above mentioned incorporated Barger U.S. Pat. No. 4,820,042 for coupling a light beam through apertures 48 and 14 directly into the cavity 12.

The fiber optics adapter assembly 53–67 may thereafter be reattached via cap screw 61 to the adapter 45 and thereby to the cavity housing typically without a need for elaborate readjustment.

According to further embodiments of the invention, an assembly of optical fiber 16 and cavity input aperture adapter 20 may be used without the component 23, and an assembly of optical fiber 16 and fiber input coupler 23 may be used without the adapter 20.

These and other modifications within the spirit and scope of the subject invention will suggest themselves or will be rendered apparent to those skilled in the art by the present extensive disclosure.

I claim:

1. In a method of mode coupling a light beam into an optical cavity having a housing and a cavity input aperture, the improvement comprising in combination the steps of:
   providing an input fiber pigtail with a fiber endface at one end of said input fiber pigtail;
   providing said input fiber pigtail with a cavity input aperture adapter integral with said input fiber pigtail at an opposite end of said input fiber pigtail for attachment to the housing of the optical cavity at said input aperture;
   providing said input fiber pigtail with a fiber input coupler integral with said input fiber pigtail at said one end of said input fiber pigtail;
   providing said fiber input coupler with an integrated lens for focusing said light beam onto said fiber endface;
   providing said fiber input coupler with a fiber endface alignment mirror;
   providing said cavity input aperture adapter with a lens assembly for directing light from said opposite end of the fiber pigtail into said input aperture of the optical cavity; and
   aligning said fiber endface with said alignment mirror relative to said light beam.

2. A method as in claim 1, wherein:
   said input fiber pigtail is made at least one meter long.

3. A method as in claim 1, including the step of:
   providing an aperture for said light beam in said alignment mirror.

4. In a method of mode coupling a light beam into an optical cavity having a housing and a cavity input aperture, the improvement comprising in combination the steps of:
   providing an input fiber pigtail with a fiber endface at one end of said input fiber pigtail;
   providing said input fiber pigtail with a cavity input aperture adapter integral with said input fiber pigtail at an opposite end of said input fiber pigtail for attachment to the housing of the optical cavity at said input aperture;
   providing said input fiber pigtail with a fiber input coupler integral with said input fiber pigtail at said one end of said input fiber pigtail;
   providing said fiber input coupler with an integrated lens for focusing said light beam onto said fiber endface;
   providing said cavity input aperture adapter with a lens assembly for directing light from said opposite end of the fiber pigtail into said input aperture of the optical cavity;
   attaching the integral cavity input aperture adapter to said housing of the optical cavity at said aperture;
   focusing said light beam with said integrated lens onto said fiber endface in said fiber input coupler;
   conducting light from the focused light beam with said input fiber pigtail to said lens assembly in said cavity input aperture adapter; and
   directing conducted light from said opposite end of the fiber pigtail with said lens assembly through said input aperture into said optical cavity.

5. A method as in claim 4, including the step of:
   providing said fiber input coupler with a fiber endface alignment mirror; and
   aligning said fiber endface with said alignment mirror relative to said light beam.

6. In a method of mode coupling a light beam into an optical cavity having a housing and a cavity input aperture, the improvement comprising in combination the steps of:
- providing an input fiber pigtail with a fiber endface at one end of said input fiber pigtail;
- providing said input fiber pigtail with a cavity input aperture adapter integral with said input fiber pigtail at an opposite end of said input fiber pigtail for attachment to the housing of the optical cavity at said input aperture;
- providing said input fiber pigtail with a fiber input coupler integral with said input fiber pigtail at said one end of said input fiber pigtail;
- providing said fiber input coupler with an integrated lens for focusing said light beam onto said fiber endface;
- providing said cavity input aperture adapter with a lens assembly for directing light from said opposite end of the fiber pigtail into said input aperture of the optical cavity;
- attaching the integral cavity input aperture adapter to said housing of the optical cavity at said input aperture;
- providing said fiber input coupler with a light beam alignment mirror;
- angularly aligning said fiber endface with said alignment mirror relative to said light beam;
- focusing said light beam with said integrated lens onto said fiber endface in said fiber input coupler;
- conducting light from the focused light beam with said input fiber pigtail to said lens assembly in said cavity input aperture adapter; and
- directing conducted light from said opposite end of the fiber pigtail with said lens assembly through said input aperture into said optical cavity.

7. A method as in claim 6, including the step of:
- providing an aperture for said light beam in said alignment mirror.

8. In a method of mode coupling a light beam into an optical cavity having a housing and a cavity input aperture, the improvement comprising in combination the steps of:
- providing an input fiber pigtail with a fiber endface at one end of said input fiber pigtail;
- providing said input fiber pigtail with a cavity input aperture adapter integral with said input fiber pigtail at an opposite end of said input fiber pigtail for attachment to the housing of the optical cavity at said input aperture;
- providing said cavity input aperture adapter with a lens assembly for directing light from said opposite end of the fiber pigtail into said input aperture of the optical cavity;
- attaching the integral cavity input aperture adapter to said housing of the optical cavity at said aperture;
- directing said light beam onto said fiber endface in said fiber input coupler;
- conducting light from the focused light beam with said input fiber pigtail to said lens assembly in said cavity input aperture adapter; and
- directing conducted light from said opposite end of the fiber pigtail with said lens assembly through said input aperture into said optical cavity.

9. A method as in claim 8, wherein:
said input fiber pigtail is made at least one meter long.

10. A method of coupling a light beam into an optical fiber, comprising in combination the steps of:
- providing said optical fiber with a fiber endface;
- providing said optical fiber with a fiber input coupler integral with said optical fiber at said fiber endface;
- providing said fiber input coupler with an integrated lens for focusing said light beam onto said fiber endface; and
- providing said fiber input coupler with a fiber endface alignment mirror for aligning said fiber endface with said alignment mirror relative to said light beam;
- providing an aperture for said light beam in said alignment mirror; and
- projecting said light beam through said aperture after angular alignment of said fiber endface with said alignment mirror.

11. A method of coupling a light beam into an optical fiber, comprising in combination the steps of:
- providing said optical fiber with a fiber endface;
- providing said optical fiber with a fiber input coupler integral with said optical fiber at said fiber endface;
- providing said fiber input coupler with an integrated lens for focusing said light beam onto said fiber endface;
- providing said fiber input coupler with a fiber endface alignment mirror for aligning said fiber endface with said alignment mirror relative to said light beam;
- angularly aligning said fiber endface with said alignment mirror relative to said light beam;
- focusing said light beam with said integrated lens onto said fiber endface in said fiber input coupler; and
- conducting light from the focused light beam with said optical fiber.

12. A method as in claim 11, including the step of:
providing an aperture for said light beam in said alignment mirror.

13. In combination, an optical cavity having a housing and a cavity input aperture, and means for mode coupling a light beam through said cavity input aperture into said optical cavity, including:
- an input fiber pigtail having a fiber endface at one end of said input fiber pigtail;
- a cavity input aperture adapter integral with said input fiber pigtail at an opposite end of said input fiber pigtail and attached to said housing around said cavity input aperture; and
- a fiber pigtail light output directing lens assembly in said cavity input aperture adapter between said opposite end of the input fiber pigtail and said cavity input aperture;
- said cavity input aperture adapter including an adapter housing, a central optical fiber adapter assembly in said adapter housing, and adjustment elements for said central optical fiber adapter in said adapter housing.

14. Apparatus as in claim 13, wherein:
said input aperture adapter includes a cavity housing fastener including an outer cavity adapter having a light beam aperture, and bearings surrounding said light beam aperture between said outer cavity adapter and said adapter housing mounted on said outer cavity adapter.

15. Apparatus for mode coupling a light beam into an optical cavity having a housing and a cavity input aperture, comprising in combination:
- an input fiber pigtail having a fiber endface at one end of said input fiber pigtail;

a cavity input aperture adapter integral with said input fiber pigtail at an opposite end of said input fiber pigtail;

a fiber input coupler integral with said input fiber pigtail at said one end of said input fiber pigtail;

a fiber endface alignment mirror on said fiber input coupler;

a light beam fiber endface focusing lens in said fiber input coupler at said fiber endface; and a fiber pigtail light output directing lens assembly in said cavity input aperture adapter at said opposite end of the input fiber pigtail.

16. Apparatus as in claim 15, wherein:
said input fiber pigtail is at least one meter long.

17. Apparatus as in claim 15, wherein:
said input aperture adapter includes a cavity housing fastener.

18. Apparatus as in claim 15, wherein:
said alignment mirror has an aperture for said light beam.

19. Apparatus as in claim 15, wherein:
said alignment mirror is circular about an aperture for said light beam.

20. Apparatus as in claim 15, wherein:
said cavity input aperture adapter includes an adapter housing, a central optical fiber adapter assembly in said adapter housing, and adjustment elements for said central optical fiber adapter in said adapter housing.

21. Apparatus as in claim 20, wherein:
said input aperture adapter includes a cavity housing fastener including an outer cavity adapter having a light beam aperture, and bearings surrounding said light beam aperture between said outer cavity adapter and said adapter housing mounted on said outer cavity adapter.

22. Apparatus for mode coupling a light beam into an optical cavity having a housing and a cavity input aperture, comprising in combination:

an input fiber pigtail having a fiber endface at one end of said input fiber pigtail;

a cavity input aperture adapter integral with said input fiber pigtail at an opposite end of said input fiber pigtail; and a fiber pigtail light output directing lens assembly in said cavity input aperture adapter at said opposite end of the input fiber pigtail;

said cavity input aperture adapter including an adapter housing, a central optical fiber adapter assembly in said adapter housing, and adjustment elements for said central optical fiber adapter in said adapter housing.

23. Apparatus as in claim 22, wherein:
said input fiber pigtail is at least one meter long.

24. Apparatus as in claim 22, wherein:
said input aperture adapter includes a cavity housing fastener including an outer cavity adapter having a light beam aperture, and bearings surrounding said light beam aperture between said outer cavity adapter and said adapter housing mounted on said outer cavity adapter.

25. Apparatus for coupling a light beam into an optical fiber having a fiber endface, comprising in combination:

a fiber input coupler integral with said optical fiber at said fiber endface;

a light beam fiber endface focusing lens in said fiber input coupler at said fiber endface; and a fiber endface alignment mirror on said fiber input coupler perpendicularly to said light beam;

said alignment mirror having an aperture for said light beam.

26. Apparatus as in claim 25, wherein:
said alignment mirror is circular about an aperture for said light beam.

27. In combination, an optical cavity having a housing and a cavity input aperture, and means for mode coupling a light beam through said cavity input aperture into said optical cavity, including:

an input fiber pigtail having a fiber endface at one end of said input fiber pigtail;

a cavity input aperture adapter integral with said input fiber pigtail at an opposite end of said input fiber pigtail and attached to said housing around said cavity input aperture;

a fiber pigtail light output directing lens assembly in said cavity input aperture adapter between said opposite end of the input fiber pigtail and said cavity input aperture;

a fiber input coupler integral with said input fiber pigtail at said one end of said input fiber pigtail;

a light beam fiber endface focusing lens in said fiber input coupler at said fiber endface; and a fiber endface alignment mirror on said fiber input coupler.

28. Apparatus as in claim 27, wherein:
said input fiber pigtail is at least one meter long.

29. Apparatus as in claim 27, including:
corresponding fastener parts on said housing and said cavity input aperture adapter.

30. Apparatus as in claim 27, wherein:
said alignment mirror has an aperture for said light beam.

31. Apparatus as in claim 27, wherein:
said alignment mirror is circular about an aperture for said light beam.

* * * * *